Figure 9:
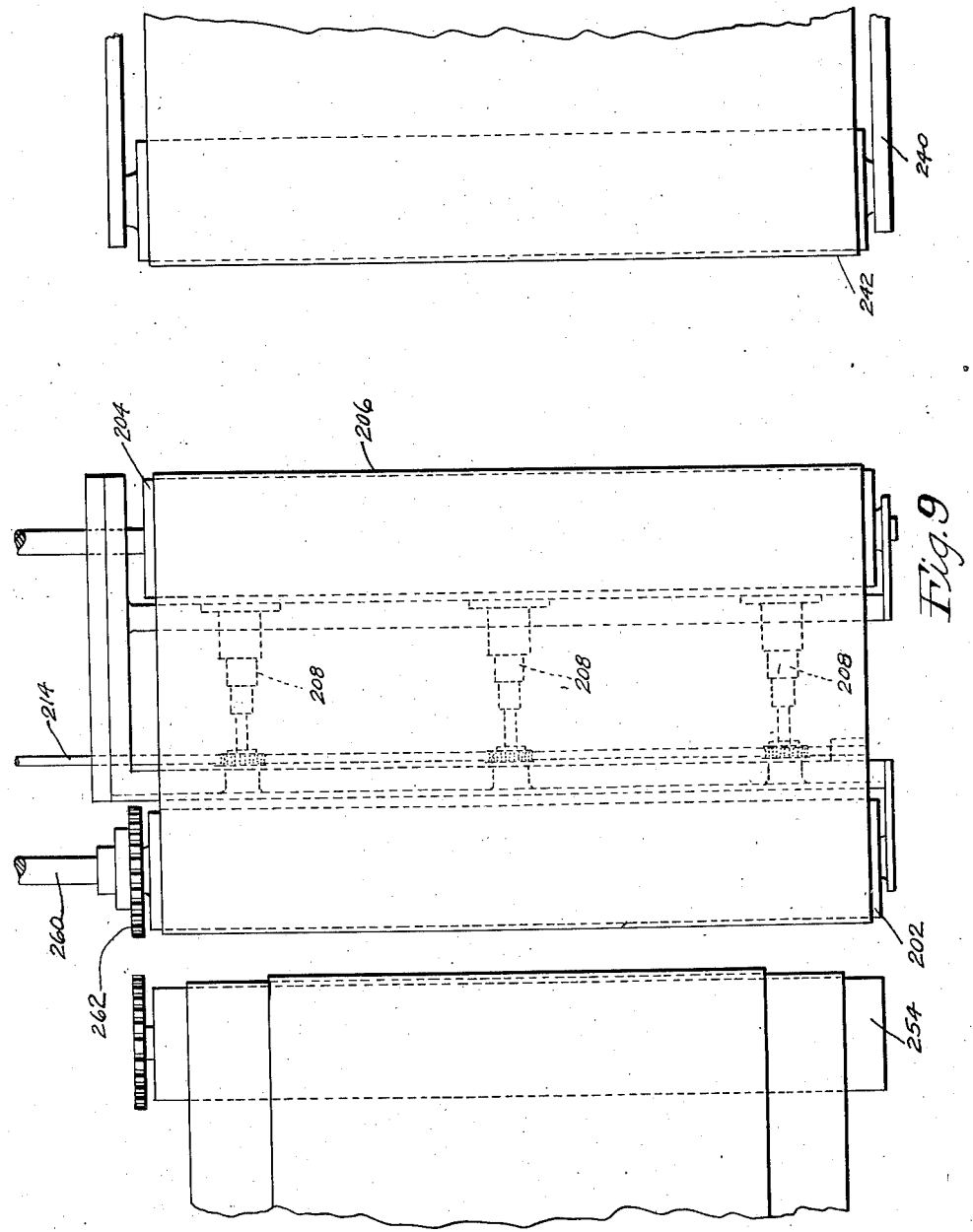

Jan. 7, 1947.  H. H. CLARK  2,414,021
BAND BUILDING APPARATUS
Filed May 15, 1942  6 Sheets-Sheet 1
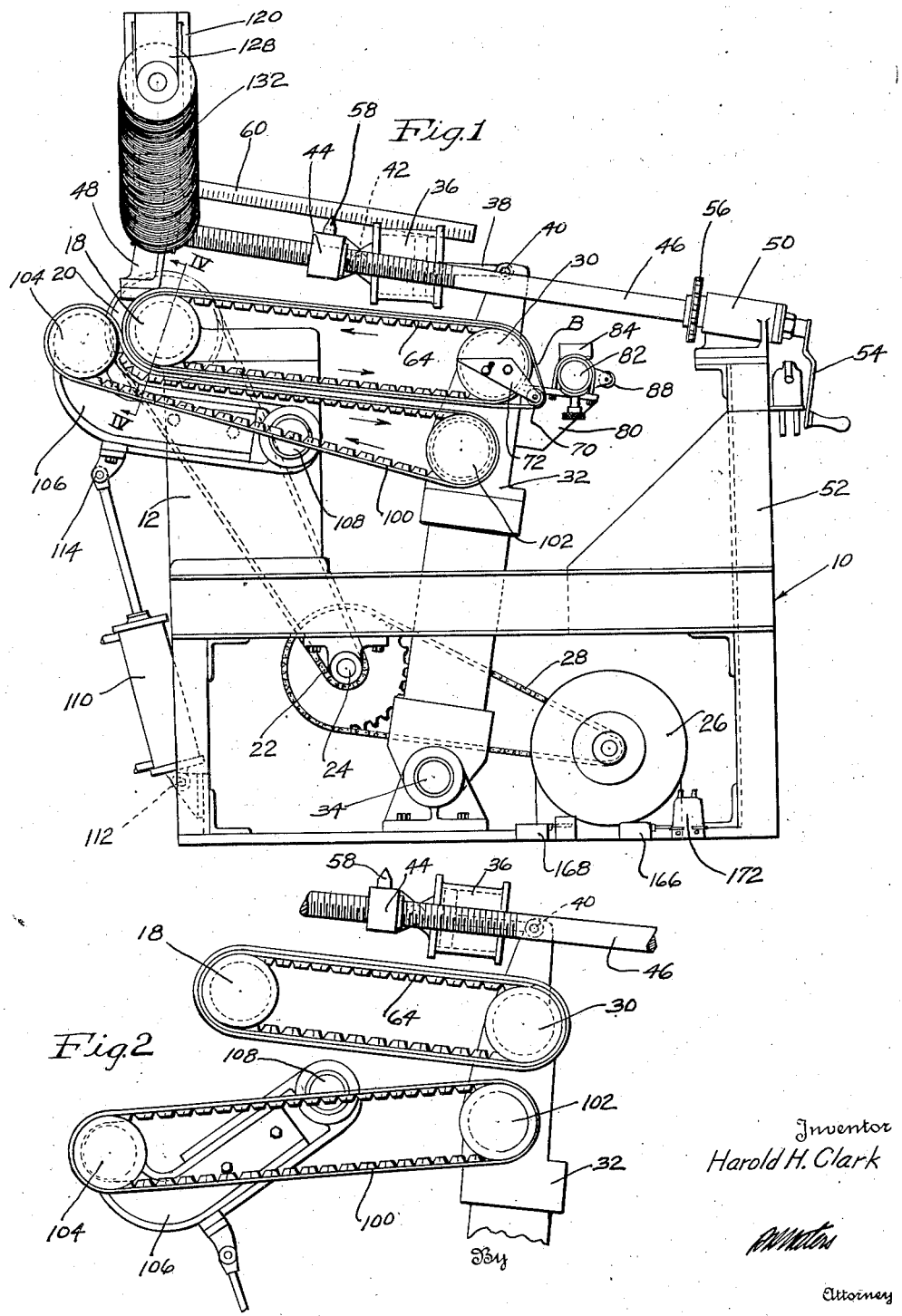
Inventor
Harold H. Clark
By
Attorney

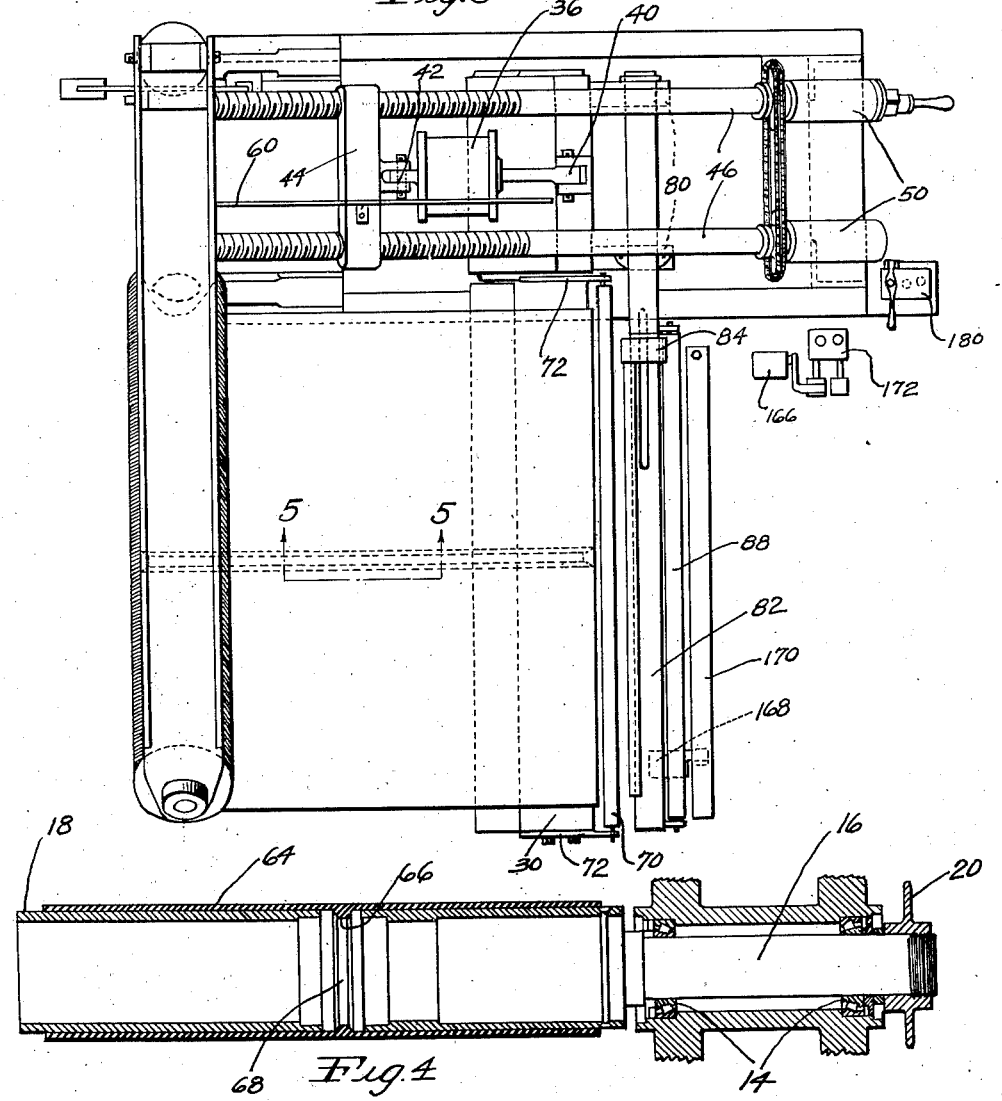

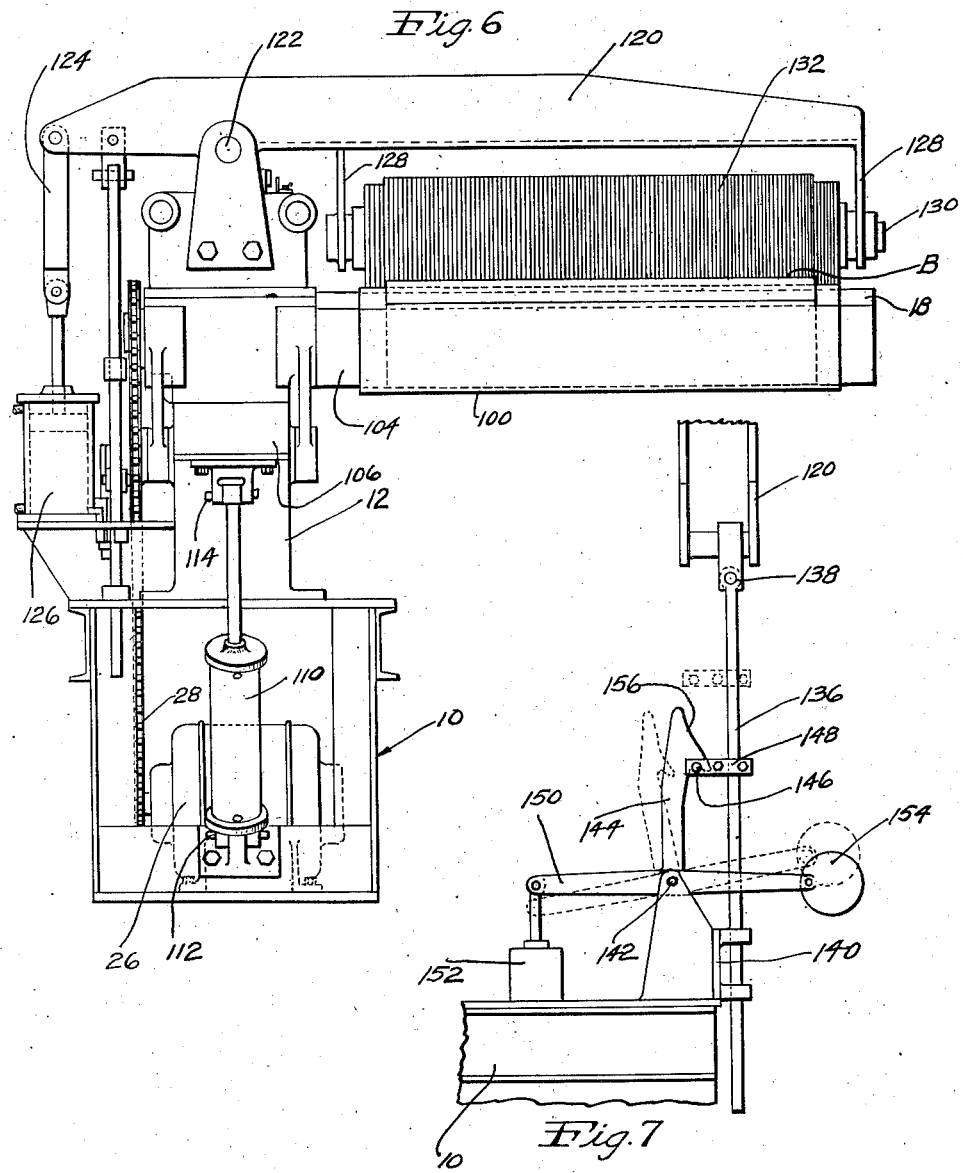

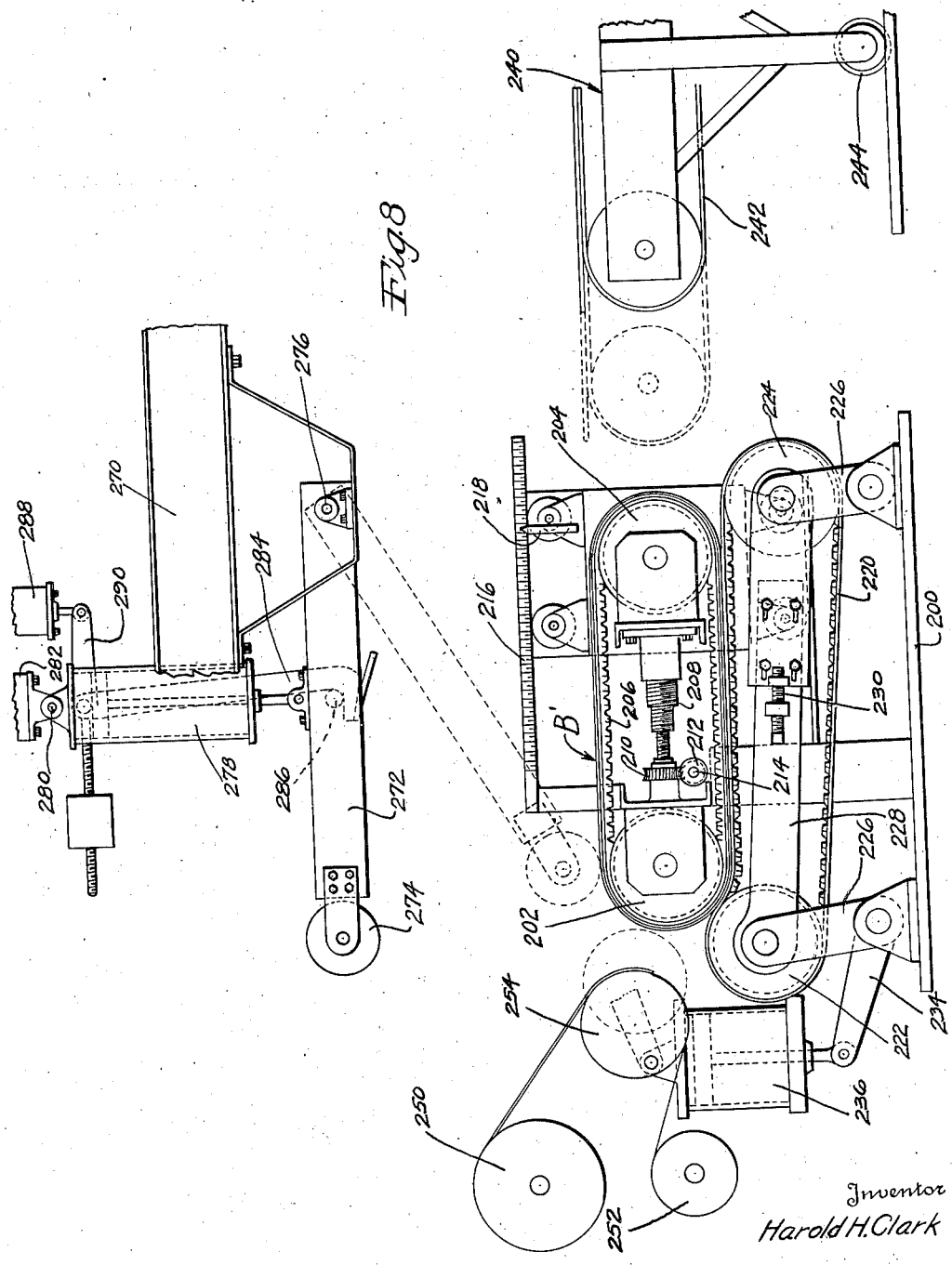

Jan. 7, 1947. H. H. CLARK 2,414,021
BAND BUILDING APPARATUS
Filed May 15, 1942 6 Sheets-Sheet 5

Inventor
Harold H. Clark
By
Attorney

Jan. 7, 1947.  H. H. CLARK  2,414,021
BAND BUILDING APPARATUS
Filed May 15, 1942  6 Sheets-Sheet 6
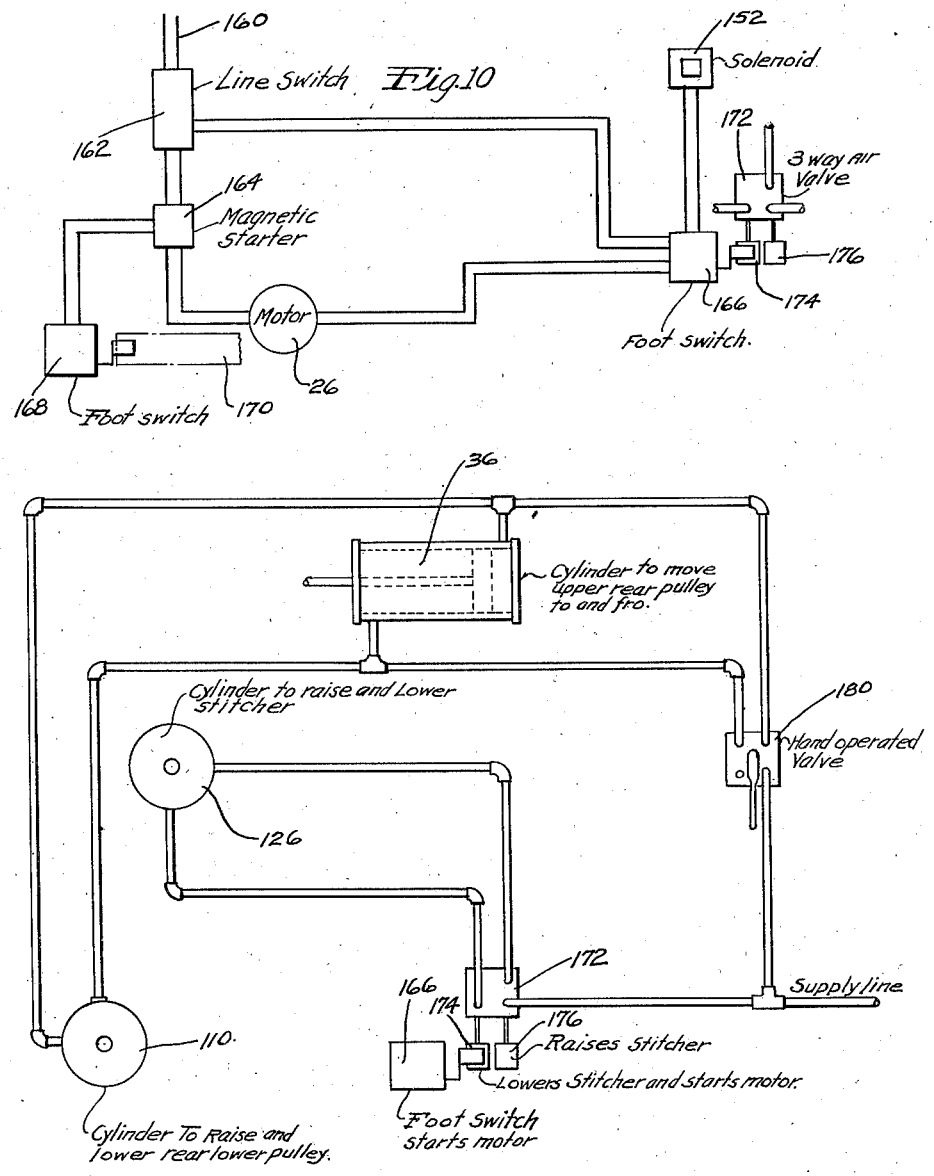
Inventor
Harold H. Clark
By
Attorney Patented Jan. 7, 1947

2,414,021

UNITED STATES PATENT OFFICE 2,414,021

BAND BUILDING APPARATUS

Harold H. Clark, Cuyahoga Falls, Ohio, assignor to Wingfoot Corporation, Akron, Ohio, a corporation of Delaware Application May 15, 1942, Serial No. 443,055

13 Claims. (Cl. 154—10)

This invention relates to apparatus for building endless, flexible bands, and, more particularly, is concerned with apparatus of this character for building rubberized cord fabric bands adapted to be incorporated into a pneumatic tire.

Heretofore, it has been the standard practice for many years to build pneumatic tires by the flat band process wherein the rubberized fabric plies are wrapped around a flat building drum in turn with the plies alternately being laid so that the rubberized cords extend at opposite angles. After the beads of the tire, the breaker assembly, and the rubber tread and the side wall portions of the tire are incorporated with the plies, the flat band is removed from the tire building drum and is shaped by fluid or mechanical pressure to the toroidal tire shape after which the tire is vulcanized in known manner. Some attempts have been made to build one or more of the plies of the tire or the breaker assembly into flat circular bands prior to placing them on the tire building drum or on the tire carcass being built thereon. However, in the past, such separate band building operations have taken more time than building the plies or breaker assembly in turn upon the tire carcass on the building drum, to say nothing of the additional cost for apparatus for building the bands and the floor space required thereby. Handling and transportation costs have further rendered separate band or breaker assembly building operations unsatisfactory in most cases. In addition, it was found that known band building apparatus often caused wrinkles, folds, and puckers, in the band being built, or trapped air pockets, and known apparatus was not adapted to build bands exactly to size or handle the building of relatively wide or different circumferential length bands.

It is the general object of my invention to avoid and overcome the foregoing and other difficulties of known methods and apparatus by the provision of band building apparatus adapted to rapidly form bands of any desired width and in exact circumferential lengths, and free of folds, wrinkles, or puckers, and with all parts of the band being firmly joined together without air pockets.

Another object of my invention is to provide new and useful apparatus of relatively inexpensive, easily operated character adapted to build uniformly high quality bands, and, particularly, rubberized fabric bands for pneumatic tires, in a minimum of time and in a manner to reduce the actual cost of building the complete pneumatic tire.

Another object of my invention is the provision of apparatus of the character described and which is quickly adjustable to build a band of any desired but exact length, and with the apparatus functioning to securely join together all portions of the band, and with the apparatus being constructed to allow the quick removal of the completed band therefrom.

Another object of my invention is to provide band building apparatus, and, specifically, pneumatic tire band building apparatus, incorporating automatic control and safety features for insuring the facile and fully safe use of the apparatus.

Another object of my invention is the provision of apparatus of the type described and adapted to build relatively wide and circumferentially long bands particularly useful in the construction of large pneumatic tires.

The foregoing and other objects of my invention are achieved by the provision of apparatus for building bands for pneumatic tires and the like, and comprising a pair of endless carriers, means for adjusting the length of at least one of the endless carriers, means for moving at least one of the carriers in an endless path, means for effecting relative movement between the supports for the endless carriers to position the carriers in cooperating relation with each other or in a non-cooperating relation, and means for stitching together the plies or parts of a band built on one of the carriers.

For a better understanding of my invention reference should be had to the accompanying drawings wherein Fig. 1 is a side elevation of one embodiment of apparatus in operative position and constructed in accordance with the principles of my invention; Fig. 2 is a fragmentary view similar to Fig. 1, and illustrating the endless carriers of the apparatus in non-cooperating relation; Fig. 3 is a plan view of the apparatus shown in Fig. 1 of the drawings; Fig. 4 is a cross-sectional view of one of the supports for an endless carrier incorporated in the apparatus, and taken substantially on line IV—IV of Fig. 1 and on a somewhat larger scale; Fig. 5 is a fragmentary sectional view taken substantially on line V—V of Fig. 3, and on a larger scale, and illustrating the construction of an endless carrier incorporated in the apparatus; Fig. 6 is an end elevation of the apparatus shown in Figs. 1 and 3; Fig. 7 is a fragmentary view of the stitcher safety locking mechanism incorporated in the apparatus of Figs. 1, 3, and 6; Fig. 8 is a side elevation of another form of apparatus incorporating the principles of my invention, and particularly adapted to operations upon larger sizes of band; Fig. 9 is a partial plan view of the apparatus illustrated in Fig. 8; Fig. 10 is a schematic wiring diagram of the control usually incorporated with the apparatus; and Fig. 11 is a schematic piping diagram of the control means ordinarily included in the apparatus.

My invention is primarily concerned with the provision of apparatus for building rubber and/or rubberized fabric bands to be incorporated in a pneumatic tire during the building thereof by the flat band process, and, accordingly, I have specifically illustrated my invention as applied thereto, and the invention will be so described.

In the drawings, the numeral 10 indicates a base, usually in the form of an angle iron frame having an upstanding bearing block 12 secured to one end thereof and journalling, in bearings 14 in cantilever relation, a shaft 16 to which is secured a roller 18. The shaft 16 and roller 18 are adapted to be driven by any suitable means, for example, the end of the shaft 16 remote from the roller 18 may have a sprocket 20 secured thereto, with the sprocket being driven by a chain 22 trained over a sprocket carried upon a jackshaft 24 journalled in the frame 10 and adapted to be driven by a motor 26 with a chain or V-belt drive 28.

Cooperating with the roller 18 is a roller 30 which is rotatably mounted on a shaft supported at one end by a swinging arm 32 which is pivotally mounted at its lower end on a shaft 34 secured to the frame 10. The upper end of the swinging arm 32 is positioned by a fluid pressure motor 36 having a piston rod 38 pivotally secured, as at 40, to the upper end of the arm. The fluid pressure motor 36 is pivotally secured at 42 to a cross head 44 carried upon threaded rods 46 which are journalled at their ends in bearings 48 and 50 secured respectively to the block 12 and to a raised end 52 of the frame 10. A crank 54 is secured to one of the rods 46 so that the rod can be rotated, and suitable means, such as a chain 56, connect the rods 46 together so that the rods are simultaneously rotated when the crank 54 is turned to move the cross head 44 to any desired position on the rods 46, as indicated by the pointer 58 carried by the cross head and an associated scale 60 secured to the bearing 48. Thus, the operative distance between the rollers 18 and 30 can be adjusted by moving the cross head 44 to any desired position on the threaded rods 46, and the distance between the rollers 18 and 30 is further instantly controlled by operation of the fluid motor 36 to release a built band, as hereinafter described.

The rollers 18 and 30 cooperate to support an endless carrier, which in the embodiment of the invention illustrated takes the form of a stretchable rubber belt 64 normally including a circumferentially extending centrally positioned rib 66 of rubber received in a groove 68 in the rollers 18 and 30 and which serves to position the belt 64 laterally with respect to the rollers 18 and 30. The rib 66 is usually made in the form of a plurality of cogs so as to facilitate bending the belt 64 around the rollers 18 and 30.

The endless carrier 64 serves as the support upon which the band built by the apparatus is constructed. In the drawings, the letter B has been used to indicate the band built on the apparatus. Preferably, although not necessarily, the band B is not supported over its entire periphery in engagement with the belt 64. Usually, I provide a separate roller 70 which is positioned to the front bottom side of the roller 30. The roller 70 is journalled at its ends in suitable adjustably positioned brackets 72 secured to the shaft rotatably supporting the roller 30. The band B is trained around the roller 70 and is thus separated from the belt 64 in the region of the roller 70. This is done for a particular reason which is as follows: It is sometimes found that the band B as built on the endless carrier 64 tends to work laterally to one side or the other of the carrier during the rotation thereof. Now by appropriately tipping one of the brackets 72 to raise or lower one end of the roller 70 the tendency for the band B to shift laterally can be compensated for and the band can at all times be held exactly centered on the carrier 64.

The swinging arm 32 may carry a bracket 80 to which may be secured suitable guide means for assisting in aligning a ply of material with the rollers 18 and 30 and the belt 64 during the band building operation. The specific guide means may take a plurality of forms but that incorporated in the apparatus includes a bar 82 having one or more adjustable guide collars 84 associated therewith. Further, I may include with the bar 82 a roller 88 which is journalled at its end in suitable brackets secured to the bar 82 so that the roller 88 is positioned in front of the bar 82.

Associated with the belt 64 and the rollers 18 and 30 which carry the belt is a second endless rotary means 100 which may take a plurality of forms, but which is conveniently made in the form of a belt similar to the belt 64 already described. One end of the belt 100 is trained around a roller 102 which is rotatably journalled upon a suitable shaft secured in cantilever relation to the swinging arm 32 and so that the roller 102 will be journalled in parallel relation to the roller 30. The other end of the belt 100 is trained around a roller 104 which is suitably journalled upon a shaft carried in cantilever relation and at one end on a bracket 106 which is pivotally secured by a stub-shaft 108 to the upstanding bearing block 12. The position of the bracket 106, and particularly the arcuate relation of the bracket is conveniently controlled by a fluid pressure motor 110 which is pivotally secured, as at 112, to the frame 10 of the apparatus, with the fluid pressure motor 110 having the end of its piston rod pivotally connected at 114 to the bracket 106. Thus, by suitably actuating the fluid pressure motor 110 the belt 100 can be moved to an operative position adjacent the belt 64, and particularly to the position shown in Fig. 1 of the drawings, or the belt 100 can be moved to the inoperative position specifically illustrated in Fig. 2 of the drawings.

After the band B is built upon the belt 64 it is advantageous to firmly stitch all of the several plies of the band B firmly together, and to this end suitable stitching means is incorporated with the apparatus. In the particular embodiment of the invention illustrated the stitching means takes the form of a beam 120 which is pivotally supported, as at 122, on the upper end of the bearing block 12, and with the position of the beam 120 being controlled through linkage 124 operated by a fluid pressure motor 126 secured to the side of the frame 10. The beam 120 has downwardly extending brackets 128 associated therewith, and between which is suported a shaft 130 which rotatably carries a plurality of relatively thin metal discs 132 having holes through their center of considerably greater diameter than the outside diameter of the shaft 130 so that the disks 132 are free to arrange themselves in any one of a plurality of axial positions so that the surfaces of the disks which engage with the belt 64 or the band B take the contour thereof and through the weight of the stitching disks 132 perform a particularly satisfactory stitching action on each longitudinal and lateral portion of the band being built. It will be noted from Fig. 1 of the drawings that the stitching disks 132 are positioned directly above the roller 18 so that the stitching pressure of the disks is directly against the band B at the point where the band is supported against the roller 18. Of course, the rotation of the belt 64 during the stitching operation effects the stitching of the entire circumferential length of the band.

I preferably incorporate with the apparatus suitable safety means which will prevent the undesired actuation of the stitching means should there be a failure of the air supplied to the fluid pressure motor 126. One satisfactory form of safety means to achieve the desired purpose has been illustrated in Fig. 7 wherein a rod 136 is pivotally secured by universal means 138 to the beam 120 with the rod extending slidably down through a suitable bracket 140 carried by the frame 10. The bracket 140 pivotally supports at 142 a bell crank having one arm 144 formed with a hook adapted to lock over a pin 146 carried by a stop 148 adjustably secured to the rod 136. The other arm 150 of the bell crank is pivotally secured to the operating shaft of suitable actuating means, such as a solenoid 152, and the arm 150 of the bell crank may be extended beyond the pivot point 142 and secured to a counter weight 154.

The hooked arm 144 of the bell crank is formed with a cammed upper end 156 so that in its downward movment the pin 146 slides over the cam surface 156 and swings the bell crank away from the full lined position towards the dotted line position shown to allow the pin 146 to pass around and underneath the hook on the arm 144 of the bell crank. Thus, the beam 120 is normally posiitoned in the raised or inoperative position to support the stitching means 132 in the manner illustrated in Fig. 1 of the drawings, and even though there should be a failure of the air to the fluid pressure motor 126 the beam 120 cannot drop down to operative position. When it is desired to operate the stitching means it is necessary to first actuate the electric solenoid 152 to move the bell crank from the full line to the dotted line position shown in Fig. 7 at which time actuation of the fluid pressure motor 126 will drop the beam 120 and the stitching disk 132 to the operative position.

Figs. 10 and 11 illustrate diagrammatically the control means for the apparatus just described. Specifically, the numeral 160 indicates the electric supply line running through a suitable line switch 162 to a magnetic starter 164 and a foot switch 166. The operation of the magnetic starter 164 is controlled by a foot switch 168, and this switch is preferably positioned on the floor adjacent the front of the apparatus and in association with a treadle bar 170 so that the operator can step on the treadle bar 170 at any point along its length and thereby operate the switch 168. Operation of the foot switch 168 operates through the magnetic starter 164 to energize the motor 26 to thereby rotate the roller 18 and the belt 64. The foot switch 166 is positioned adjacent a three way air valve 172, having control pedals 174 and 176 so that the pedal 174 and the foot switch 166 can be simultaneously operated. The foot switch 166 controls the actuation of the solenoid 152 to release the hooked arm 144 of the bell crank incorporated in the safety mechanism shown in Fig. 7 of the drawings.

Turning now to Fig. 11 of the drawings, I have schematically illustrated the piping diagram for supplying fluid to one side or the other of the pistons incorporated in the fluid pressure motors 36, 110 and 126. Also, the diagram includes the foot operated three way valve 172, the foot operated switch 166 for controlling the operation of the solenoid 152, and a hand operated three way air valve 180. It will be evident from the schematic piping diagram that operation of the hand valve 180 causes the operation of the fluid pressure motors 36 and 110 to move the bracket 106 and the swinging arm 32 to position the apparatus in either the operative position shown in Fig. 1 of the drawings, or in the inoperative unloading position shown in Fig. 2 of the drawings. Further, stepping on the foot control pedal 174 of the valve 172 causes a closing of the switch 166, the operation of the solenoid 152 to unlatch the safety mechanism shown in Fig. 7 and the lowering of the stitcher by the fluid pressure motor 126. The foot switch 166 may, and preferably is, connected to the motor 26 so that the lowering of the stitcher simultaneously effects an operation of the motor 26 to rotate the belt 64 and the band B beneath the stitching disks 132 during the stitching operation. Stepping on the control pedal 176 of the valve 172 effects operation of the fluid pressure motor 126 in the opposite direction to raise the stitcher and stop the operation of the motor 26.

It is believed that the operation of the apparatus of my invention will be evident from the foregoing detailed description. Suffice it to add that the distance between the rollers 18 and 30 is first adjusted during a band building operation so that the band built on the apparatus will be of the proper and exact circumferential length. The adjusting of the distance between the rollers 18 and 30 is, of course, controlled by the rotation of the crank 54 to position the swinging arm 32 at the desired angle. The exact size of band which can then be built on the apparatus will be indicated on the scale 60 by the pointer 58, the scale 60 being appropriately calibrated. Thereafter, a ply or length of band forming material is fed into the apparatus from the right hand side of the apparatus as viewed in Figs. 1 and 3 of the drawings, the ply of material is suitably guided over the roller 70 and shaft 82 and the end of the ply is engaged with the top of the belt 64. The operator then steps on any portion of the length of the treadle bar 170 to operate the motor 26 and drive the belt 64 in the direction shown by the arrows in Fig. 1, and the end of the ply material is carried around the belt 64 down between the belt 64 and the belt 100 and is fed out between the belts at which point the operator catches the end of the ply material and folds it back over the roller 70 and on to the top of the belt 64 adjacent the roller 30. The motor 26 may be fed intermittently under close control by the operator during this wrap around operation, and then the operator will join the two ends of the ply material together to form the first ply of the band.

After the ply has been joined end to end the operator of the apparatus will usually run the first ply thus assembled several times around on the belt 64 so that he can see the band is free from wrinkles and so that he can position the splice at a point remote from the splice of the next ply which will be built into the band. It might be noted here that the cooperating action of the belts 64 and 100 is such that the first ply, and any ply material built into the band is substantially free from wrinkles, puckers, or any other undesirable portion. With the first ply of material positioned so that its splice is towards the far end of the bottom of the belt 64 a second ply of material, usually having the rubberized cords running at an opposite angle to the cords of the first ply, is built onto the first ply in substantially identical manner to that already described. In like fashion, any additional number of plies can be built into the band in a relatively rapid and efficient manner.

Once the various plies have been built into the band, and it will be appreciated that the term ply is intended to include breaker assemblies, chafer strips, or other materials, the operator steps on the treadle 174 of the valve 172 to thereby release the safety mechanism of Fig. 7 and to operate the fluid pressure motor 126 to lower the stitching disk 132 into engagement with the band. The motor 26 is also operated to rotate the belt 64 and the band B beneath the stitching mechanism to effect a very positive and satisfactory stitching of the various plies and parts of the band intimately together. The operator now throws hand valve 180 to operate fluid pressure motors 36 and 110 to move the swinging arm 132 and to drop the bracket 106 to move the roller 104 to the position shown in Fig. 2 of the drawings. The belts 64 and 100, preferably made of the resilient material, as described, contract during this operation so that their circumferential lengths are decreased and so that the belt 100 is not in contact with the other side of the belt 64. It is now a simple operation to slide the band B endwise off the belt 64 and rollers 18 and 30 and to place the finished band on suitable means for transporting the same to a tire building or other operation. Reversing the hand valve 180 will return the apparatus to the operative position shown in Fig. 1 and the band building operation can be repeated.

The form of my invention illustrated in Figs. 8 and 9 of the drawings is generally similar to that already described but differs primarily in the respect that the apparatus of Figs. 8 and 9 is adapted to build bands of greater width and longer circumferential length. Specifically, Figs. 8 and 9 of the drawings indicate an apparatus including a frame 200 rotatably supporting in suitable bearings a roller 202 and slidably supporting a companion roller 204 which cooperates with the roller 202 to support an endless rotary member, such as a flexible rubber belt 206 of a type which may be quite similar to the belt 64 described above. The relative position of the roller 204 with respect to the roller 202 may be conveniently controlled by suitable screw means 208 adapted to be actuated by worm gear means 210 which are rotated by worms 212 carried upon a shaft 214 and extending to the outside of the frame 200. A scale 216 is supported by the frame 200 and a pointer 218 carried by the bearings for the roller 204 is a visible calibrated indication of the length of the band which will be built upon the belt 206 for a given setting of the roller 204. Cooperating with the under side of the belt 206 is a belt 220 of similar character and supported between rollers 222 and 224. The rollers 222 and 224 are carried by parallel links 226 pivotally secured to the frame 200 and to a connecting bar 228 of adjustable length, for example, by the use of screw means, indicated generally by the numeral 230. A bell crank 234 pivotally connected to a fluid pressure motor 236 serves to actuate the parallel links 226 to move the rollers 222 and 224, and thus the belt 220 to and from an operative position relative to the under side of the belt 206.

Associated with the belt 206 is a feed-in table, indicated as a whole by the numeral 240, and including an endless belt 242 having its upper reach substantially at the same vertical level as the upper reach of the belt 206. The feed-in table 240 is of considerable length and width so that any ply material adapted to be built into a band on the belt 206 may be carried upon the endless belt means 242 of the feed-in table 240. The belt 242 may be driven to feed a length of ply material into the belt 206, or the belt can merely be moved by hand to feed the ply material onto the point on the belt 206 where the rotation of the belt will pick up the ply material from the feed in mechanism and rotate the belt 242. The entire feed-in mechanism or table 240 is preferably mounted upon rollers 244 so that the entire table can be moved from the full line position shown in the drawings to the dotted line position, or beyond, so as to facilitate the transfer in properly aligned relation of any ply material from the feed-in mechanism to the belt 206. The feed-in mechanism may have the belt 242 appropriately marked so as to properly align the ply material therewith and to facilitate and insure the accurate alignment of the ply material on the belt 206.

Associated with the roller 202 are means for supplying additional ply material to the belt 206. These means include a let-off roll 250, a wind-up roll 252 and a positioning roll 254. The roll 254 is adapted to be moved from the full line to the dotted line position illustrated in Fig. 8 of the drawings so that any ply material, for example, a breaker strip assembly, carried by the liner may be stripped from the liner adjacent the roller 254 and applied to the ply material built up to form the band B' on the belt 206. The liner is, of course, wound up on the wind-up roll 252.

The roller 202 is adapted to be positively rotated by any suitable means, such as an electric motor, which is adapted to be connected to the shaft 260 supporting the roller 202, or to a gear means 262 secured to the shaft. The control means and motor have not been illustrated since they conveniently take substantially the form illustrated and described in detail in conjunction with the form of the invention shown in Figs. 1 to 7 of the drawings.

Fig. 8 also illustrates that the stitching mechanism incorporated with the large size band building apparatus of Figs. 8 and 9 takes the form of overhead means supported upon a suitable beam 270 and including an arm 272 carrying the stitching disks 274. The arm 272 is pivotally secured, as at 276, to suitable brackets extending downwardly from the beam 270. The position of the arm 272 is controlled by a fluid pressure motor 278 which is pivotally secured, as at 280, to an overhead support 282. A safety latch 284 is adapted to engage with a pin 286 carried by the arm 272, and suitable solenoid means 288 and a bell crank 290 are incorporated with the latch 284 so as to lock the stitching mechanism in the inoperative position except when the solenoid 288 is actuated, all in the manner described in conjunction with the apparatus shown in Fig. 7 of the drawings.

The operation of the apparatus illustrated in

Figs. 8 and 9 of the drawings is so similar to that described in detail above that this application will not be burdened with further description.

From the foregoing it will be recognized that the various objects of my invention have been achieved by the provision of improved apparatus for building endless bands of ply material, and particularly rubberized fabric bands for incorporation into a pneumatic tire during the building operation. The apparatus is relatively inexpensive, easily operated, and is sturdy and long lived, and can be operated by the ordinary workman to rapidly and efficiently produce high quality bands of exact but any desired length and width.

Although I have illustrated and described my invention in detail, it should be particularly understood that I am not to be limited thereto or thereby but that the scope of my invention is defined in the appended claims.

I claim:

1. Apparatus for building bands for pneumatic tires and the like, comprising a pair of endless carriers, means for moving at least one of the carriers in an endless path, means for effecting relative movement between the supports for the endless carriers to position the carriers in cooperating relation with each other or in non-cooperating relation with each other, and a tiltable roller for laterally positioning the plies of a band built on one of the carriers.

2. Apparatus for building bands for pneumatic tires and the like, comprising a pair of endless carriers, means for moving at least one of the carriers in an endless path, means for effecting relative movement between the supports for the endless carriers to position the carriers in cooperating relation with each other, means for stitching together the plies of a band built on one of the carriers, and at least one of the endless carriers being of stretchable rubber, means adjustably supporting the stretchable carrier at any one of a plurality of circumferential lengths, and additional means for moving the supporting means together to collapse the carrier and facilitate the removal of a band therefrom.

3. A band building machine including a pair of endless carriers, means for driving one of the carriers, means for supporting the other carrier adjacent the first carrier with stretchers of the carriers in opposed substantially parallel relation with each other, means for effecting relative movement between the supports for the carriers to bring the opposed stretches substantially into engagement with each other and to press therebetween a band built on one of the carriers, and means for changing the length of the carrier on which the band is built.

4. A band building machine including a pair of endless carriers, means for driving one of the carriers, means for supporting the other carrier adjacent the first carrier with stretches of the carriers in opposed substantially parallel relation with each other, and means for effecting relative movement between the supports for the carriers to bring the opposed stretches substantially into engagement with each other and to press therebetween a band built on one of the carriers.

5. A band building machine including a pair of endless carriers, means for driving one of the carriers, means for supporting the other carrier adjacent the first carrier with stretches of the carriers in opposed substantially parallel relation with each other, means for effecting relative movement between the supports for the carriers to bring the opposed stretches substantially into engagement with each other and to press therebetween a band built on one of the carriers, self-adjusting substantially cylindrical stitching means, and means adapted to effect relative movement between the stitching means and the carrier on which the band is built.

6. Band building apparatus including a pair of endless belts, rotatable means supporting the belts so that unsupported stretches thereof are in opposed relation, means for moving the supporting means to move the belts into engagement with each other, at least one belt including a relatively flat body of extensible material, and a longitudinally extending rib on the inner surface of the body and received in a groove on the rotatable supporting means, and means for rotating at least one of the rotatable supporting means.

7. Band building apparatus including a pair of endless belts, rotatable means supporting the belts so that unsupported stretches thereof are in opposed relation, at least one belt including a relatively flat body of extensible material, and a longitudinally extending rib on the inner surface of the body and received in a groove on the rotatable supporting means.

8. Band building apparatus including a rotatable carrier, means for driving the carrier, means for adjusting the circumferential length of the carrier to any one of a plurality of sizes, an endless flexible member, means for moving the flexible member to and from a position to engage with a portion of the carrier and to be driven thereby, means for aligning and supplying a length of band material to the carrier, said means being movable to and from a position adjacent the carrier, stitching means including a plurality of circular disks in face-to-face relation, means for moving the stitching means to and from operative relation with the carrier, and safety lock means normally holding the stitching means in inoperative position.

9. Band building apparatus including a rotatable carrier, means for driving the carrier, means for adjusting the circumferential length of the carrier to any one of a plurality of sizes, an endless flexible member, means for moving the flexible member to and from a position to engage with a portion of the carrier and to be driven thereby, means for aligning a length of band material as it is presented to the carrier, stitching means, and means for moving the stitching means to and from operative relation with the carrier.

10. Apparatus for building bands for pneumatic tires and the like comprising a pair of endless belts, at least one of the belts being extensible, rotatable means supporting the belts for movement to and from a position where unsupported stretches of the belts engage with each other, screw means for adjusting the length of at least one of the belts, fluid pressure means for changing the length of at least one of the belts and for moving the supporting means to position the belts in operative or inoperative relation to each other, means for rotating at least one belt, stitching means, fluid pressure means for moving the stitching means away from operative relation with one of the belts, a safety lock for holding the stitching means in inoperative relation, electric means for releasing the lock, and means for simultaneously actuating the belt rotating means, the electric means and the fluid pressure means associated with the stitching means.

11. Apparatus for building bands for pneumatic tires and the like comprising a pair of endless belts, at least one of the belts being extensible, rotatable means supporting the belts for movement to and from a position where unsupported stretches of the belts engage with each other, screw means for adjusting the length of at least one of the belts, and fluid pressure means for changing the length of at least one of the belts and for moving the supporting means to position the belts in operative or inoperative relation to each other.

12. Apparatus for building bands for pneumatic tires and the like comprising a pair of endless belts, rotatable means supporting the belts for movement to and from a position where unsupported stretches of the belts engage with each other, stitching means, fluid pressure means for moving the stitching means away from operative relation with one of the belts, a safety lock for holding the stitching means in inoperative relation, electric means for releasing the lock and means for simultaneously actuating the electric means and the fluid pressure means associated with the stitching means.

13. Band building apparatus including an endless belt, means supporting and rotating the belt, alignment means positioned for substantially horizontal movement to and from a position adjacent the travel of the belt, said alignment means including a table having a movable endless surface adapted to receive and to present a ply of material to be built into a band on the endless belt, and material supplying means positioned adjacent another portion of the endless belt and including a material and liner let-off and a liner wind-up.

HAROLD H. CLARK.